United States Patent
Smith

(10) Patent No.: US 8,190,311 B2
(45) Date of Patent: May 29, 2012

(54) ADAPTIVE BRAKE SCHEME DURING A LOCOMOTIVE DISTRIBUTED POWER COMMUNICATION LOSS

(75) Inventor: Eugene A. Smith, Satellite Beach, FL (US)

(73) Assignee: General Electric Company, Schenectady, NY (US)

(*) Notice: Subject to any disclaimer, the term of this patent is extended or adjusted under 35 U.S.C. 154(b) by 1120 days.

(21) Appl. No.: 12/042,568

(22) Filed: Mar. 5, 2008

(65) Prior Publication Data

US 2009/0223760 A1 Sep. 10, 2009

(51) Int. Cl.
*B60T 11/00* (2006.01)
(52) U.S. Cl. .......................... 701/19; 188/3 H; 303/22.7
(58) Field of Classification Search .................. 701/19, 701/20, 70; 188/3 R, 3 H; 303/22.6, 22.7
See application file for complete search history.

(56) References Cited

U.S. PATENT DOCUMENTS

| | | | |
|---|---|---|---|
| 3,525,556 A * | 8/1970 | Ferguson | 303/67 |
| 4,041,283 A * | 8/1977 | Mosier | 701/20 |
| 4,946,229 A | 8/1990 | Deno et al. | |
| 5,507,457 A * | 4/1996 | Kull | 246/169 R |
| 5,738,311 A | 4/1998 | Fernandez | |
| 6,095,618 A | 8/2000 | Heneka et al. | |
| 6,219,595 B1 | 4/2001 | Nickles et al. | |
| 6,275,165 B1 * | 8/2001 | Bezos | 340/3.44 |
| 6,375,275 B1 | 4/2002 | Smith, Jr. et al. | |
| 6,487,488 B1 | 11/2002 | Peterson, Jr. et al. | |
| 6,824,226 B2 * | 11/2004 | Smith et al. | 303/81 |
| 6,866,347 B2 | 3/2005 | Smith et al. | |
| 7,395,141 B1 * | 7/2008 | Seck et al. | 701/19 |
| 2003/0009274 A1 | 1/2003 | Peterson, Jr. et al. | |
| 2003/0107262 A1 | 6/2003 | Smith et al. | |
| 2007/0120417 A1 | 5/2007 | Root et al. | |
| 2007/0236078 A1 | 10/2007 | Smith et al. | |
| 2007/0241610 A1 * | 10/2007 | Smith | 303/22.6 |

* cited by examiner

*Primary Examiner* — Paul N Dickson
*Assistant Examiner* — Timothy Wilhelm
(74) *Attorney, Agent, or Firm* — GE Global Patent Operation; John A. Kramer

(57) ABSTRACT

An adaptive brake system for a distributed power train responsive to an interruption in a communication system for the train and a brake application initiated at the lead locomotive, reduces the brake pipe fluid pressure at a lead locomotive and a remote locomotive to a predetermined pressure level to reduce in-train forces that may occur as a result of the pressure differentials in the brake pipe line of the lead and remote locomotives.

17 Claims, 3 Drawing Sheets

ADAPTIVE BRAKE SCHEME DURING A LOCOMOTIVE DISTRIBUTED POWER COMMUNICATION LOSS

BACKGROUND OF THE INVENTION

This invention relates generally to pneumatic braking systems and more particularly to a pneumatic braking system for a train consist comprising a lead locomotive and one or more remote locomotives.

One of the most critical aspects of the operation of railroad vehicles is the predictable and successful operation of the air brake system. However the air brake system is subjected to a variety of dynamic effects, not only as a result of the controlled application and release of the brakes in response to changes in brake pipe pressure, but also due to the varying operating conditions encountered by the train. Thus multiple operating scenarios must be considered for the successful design and operation of the air brake system.

At each railcar, a control valve (typically comprising a plurality of valves and interconnecting piping) responds to locomotive operator-initiated changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. The control valve at each railcar senses the drop in brake pipe air pressure as the pressure drop propagates along the brake pipe. In response, at each railcar pressurized air is supplied from a local railcar reservoir to the wheel brake cylinders, which in turn drive the brake shoes against the railcar wheels. The railcar reservoir is charged by supplying air from the brake pipe during non-braking intervals. Typically, the pressure reduction in the brake pipe for signaling a brake application is about seven to twenty-six psi, with a nominal steady state brake pipe pressure of about 90 psi. The braking pressure applied to the railcar wheels is proportional to the drop in the brake pipe pressure. Thus it can be seen that the brake pipe serves to both supply pressurized air to each railcar for powering the brake shoes during a brake application and also serves as the medium for communicating brake application and release instructions to each railcar.

The railcar brakes can be applied in two different modes, i.e., a service brake application or an emergency brake application. A service brake application involves the application of braking forces to the railcar to slow the train or bring it to a stop at a forward location along the track. During service brake applications the brake pipe pressure is slowly reduced and the brakes are applied gradually in response thereto. An emergency brake application commands an immediate application of the railcar brakes through an immediate evacuation or venting of the brake pipe. Unfortunately, because the brake pipe runs for several thousand yards along the length of the train, the emergency braking evacuation does not occur instantaneously along the entire length of the brake pipe. Thus the braking forces are not uniformly applied at each railcar to stop the train.

After one emergency brake application or two or three service brake applications, the brake pipe must be recharged to its nominal operating pressure by supplying pressurized air from a reservoir on the locomotive into the brake pipe. Effective subsequent brake applications cannot be made until the recharging process has been completed.

FIG. 1 illustrates a typical prior art brake system employed by a railway freight train. In a conventional train having only a lead locomotive, the train brake system comprises a locomotive brake system located on a locomotive 100 and a set of railcar brake systems located on a plurality of railcars illustrated by a railcar 200. The application and release of braking action is controlled by an operator within the locomotive 100, who uses a manually operated brake handle to effect braking action. The locomotive includes an air brake control system 102 for supplying air pressure to or controllably venting a pressurized brake pipe 101 via a relay valve 117. The pressurized brake pipe 101 is in fluid communication with each of the railcars 200 of the train as shown.

The locomotive brake control system 102 comprises an air supply input link 111 for supplying pressurized fluid (air) through which the brake pipe 101 is charged. A flow measuring adapter 113 is connected to the air supply link 111 for measuring the charging rate (as a differential pressure between the air supply and output port 116) of the brake control system 102. The output port 116 of the flow measuring adapter 113 is connected to an input port 121 of a relay valve 117. A bi-directional port 122 of the relay valve 117 is coupled to the brake pipe 101. The relay valve 117 further includes a port 123 coupled through an air pressure control link 103 to an equalizing reservoir 105. The pressure control link 103 is also connected to a pressure control valve 107 through which the equalizing reservoir 105 is charged and discharged in the process of a brake operation. A port 124 of the relay valve 117 is controllably vented to the atmosphere as an exhaust port. Coupled with brake pipe 101 and air pressure control link 103 are respective pressure measuring and display devices 131 and 133. The brake pipe gauge 131 measures the air pressure in the brake pipe 101 and the equalizing reservoir gauge 133 measures the pressure in the equalizing reservoir 105.

The components of a railcar air brake control system 202, include a control valve 203 having a port 221 coupled to the brake pipe 101. The control valve 203 also includes a port 222 coupled to a pressure storage and reference reservoir 205. Finally, the control valve 203 includes a port 223 coupled to an air brake cylinder 231, comprising a piston 232 connected to a brake shoe 233. An increase in air pressure at the port 223 is fluidly communicated to the piston 232 for driving the brake shoe 233 against the wheels 235 of the railcar 200. Thus the air brake control system 102 of the locomotive 100 controls operation of the pneumatically operated brake shoes 233 at each of the wheels 235 of each railcar 200.

During train operation, the brake pipe valve 120, through which the components of the brake control system 102 are coupled to the brake pipe 101, is open to create a continuous brake pipe fluid path between the locomotive 100 and all of the railcars 200 of the train. The brake pipe valve 120 is controlled by a brake valve cut-out valve 250, that is in turn, controlled by a pilot valve 251. The pilot valve 251 can be manually operated by the locomotive operator to close the brake pipe valve 120 when it is desired to terminate brake pipe charging. There are also other valves and control components (not shown in FIG. 1) that automatically terminate brake pipe charging during an emergency brake application by activating the pilot valve 251 which closes the brake pipe valve 120. Each railcar 200 also includes a manually-operated brake pipe valve 240, as shown in FIG. 1.

The brake system is initially pressurized by the operation of the pressure control valve 107, which controls the air supply to the control link 103 to charge the equalizing reservoir 105 to a predetermined pressure. The relay valve 117 is then operated to couple port 121 with the port 122 so that air is supplied there through to the brake pipe 101, charging the brake pipe 101 to the predetermined charge pressure, as established by the pressure of the equalizing reservoir 105. When the brake pipe pressure reaches the predetermined pressure, the pressure at the port 122 (connected to the brake pipe 101) equals the pressure at the port 123 (connected to the equalizing reservoir 105). This condition indicates a charged brake pipe and the fluid flow path from the air supply port 121 to the brake pipe 101 via the relay valve 117 is closed.

The pressure storage and reference reservoir 205 of each railcar 200 is fully charged from the brake pipe 101 through the control valve 203, thereby establishing a reference pressure for maximum withdrawal of the piston 232 and complete release of the brakes 233 for each of the railcars 200.

To brake the railcars 200, the train operator operates the pressure control valve 107 using the braking handle in the locomotive cab. This operation causes a partial venting of the air pressure control link 103 through the exhaust port of the pressure control valve 107, reducing the pressure within the equalizing reservoir 105. This pressure reduction is sensed by the relay valve 117 at the port 123. In turn, the pressure reduction causes the bi-directional port 122 to be coupled to the exhaust port 124, thereby exhausting the brake pipe 101 to the atmosphere. The venting of the brake pipe 101 continues until the pressure within the brake pipe 101 equals the pressure of equalizing reservoir 105.

As the pressure in the brake pipe 101 falls, the control valve 203 in each of the cars 200 senses the pressure reduction by comparing the brake pipe pressure with the pressure storage and reference reservoir pressure. This pressure reduction causes a corresponding increase in the air pressure applied to the brake cylinder 231 from the port 223, resulting in an application of the brake shoes 233 against the wheels 235 in proportion to the sensed pressure reduction in the brake pipe 101.

Further pressure reductions in the equalizing reservoir 105 by the train operator produce corresponding pressure reductions in the brake pipe 101 and, corresponding additional braking effort by the brake shoes 233 in each of the railcars 200. In summary, the intended operation of the brake system in the cars 200 and specifically the braking effort applied in each of the cars 200, is proportional to the reduction in pressure in the equalizing reservoir 105 within the locomotive 100.

When the locomotive operator desires to release the train car brakes, he/she operates the pressure control valve 107 via the braking handle, to effectuate a recharging of the air brake system 102. The recharging is accomplished by bringing the pressure within the equalizing reservoir 105 back to its fully charged state by supplying pressurized air via the air supply. With the equalizing reservoir 105 recharged, there is again a pressure differential (but opposite in sign to the previous pressure drop in the pressure line 103) between the ports 122 and 123 of the relay valve 117 that causes the brake pipe 101 to be charged with pressurized air from air supply 111 through the flow measuring adapter 113 and the relay valve 117. The brake pipe pressure increase is sensed by the control valve 203 in each of the railcars 200 to cause the brake shoes 233 to be released by the action of the brake cylinder 231.

Distributed power train operation supplies motive power from a lead locomotive and one or more remote locomotives spaced apart from the lead unit in the train consist. Distributed train operation may be preferable for long train consists to improve train handling and performance. Each lead and remote locomotive includes an air brake control system, such as the air brake control system 102 discussed above, and a communications system for exchanging information between the lead and the remote units. Conventionally the communications system comprises a radio frequency link and the necessary receiving and transmitting equipment at each of the lead and the remote units.

The description of the present invention below with respect to the brake control system of a remote locomotive in a distributed power train consist refers to the same brake control system components and uses the same reference characters as described above in conjunction with the brake control system of the lead locomotive. Specific mention will be made if the reference pertains only to the lead or only to the remote locomotive.

On distributed power trains equipped with UIC (Union Internationale de Chemins Fer) wagon braking equipment, braking is accomplished by venting the brake pipe 101 at both the lead and remote locomotives, thus accelerating the brake pipe venting and the application of the brakes at each railcar, especially for those railcars near the end of the train. Brake pipe venting at only the lead unit requires propagation of the brake pipe pressure reduction along the length of the train, thus slowing brake applications at railcars distant from the lead unit. For a distributed power train with an operative communications link between the lead and remote units, when the train operator commands a brake application by operation of the brake handle at the lead unit, a brake application command is transmitted to each remote unit over the radio frequency communications link. In response, each remote unit also vents the brake pipe through its respective relay valve 117. Thus braking actions at the remote locomotives follow the braking actions of the lead unit in response to signals transmitted by the communications system. As a result, the entire brake pipe is vented faster than if the venting occurred only at the lead locomotive. A brake release initiated at the lead unit is also communicated over the radio frequency link to the remote units so that the brake pipe 101 is recharged from all locomotives.

If the communications system is inoperative or if the communications link between the lead unit and the remote units is disrupted (for example, if line-of-sight directivity is lost due to track topology or an interfering object), when the lead operator makes a brake application the remote locomotives will not receive the brake application command via the communications system. Thus the brake application is executed by venting the brake pipe only at the lead locomotive, resulting in a slower brake application at all the railcars.

It is known that leaks can develop in the brake pipe, causing unwanted pressure reductions. Thus in one operational mode for a distributed power train, the remote units (and the lead unit) continually charge the brake pipe 101 when the pressure falls below a nominal value (i.e., whenever a brake application is not in progress). A remote unit senses the brake pipe pressure via the relay valve 117, that compares the equalizing reservoir pressure with the brake pipe pressure. Whenever the brake pipe pressure is less than the equalizing reservoir pressure, the brake pipe 101 is charged from the air supply 111 via the relay valve 117 of the remote unit. However, a remote unit should not recharge the brake pipe when a brake application has been initiated at the lead unit.

A dangerous scenario can develop if a brake application command transmitted over the communications link from the lead unit does not reach the remote locomotive while the latter is monitoring and recharging the brake pipe to compensate for pressure reductions caused by leaks within the brake pipe 101. Typically, the recharging process is initiated if the brake pipe pressure falls below a nominal predetermined value. In this situation the remote locomotive continues to recharge the brake pipe 101 as the lead unit is venting the brake pipe to signal a brake application to the railcars 200. This situation can cause dangerously high in-train forces to develop.

One prior art technique for avoiding this scenario is to automatically close the brake pipe valve 120 of the remote unit whenever communications is lost between the lead and the remote locomotive units. With the brake pipe valve 120 closed, the remote units cannot recharge (nor vent) the brake pipe 101. Thus all brake signaling (both brake applications and brake releases) over the brake pipe 101 is initiated from the lead unit. Although under this condition the remote locomotives cannot assist with the brake pipe venting to accelerate brake applications at the railcars 200, the remote locomotives also cannot erroneously recharge the brake pipe while the lead unit is venting it.

The prior art LOCOTROL® distributed power communications system (available from the General Electric Company of Schenectady, N.Y.) incorporates a variant of the technique described above by including a brake pipe flow sensing function at each remote locomotive in a distributed power train. A flow sensor, such as the flow measuring adapter 113 as depicted in FIG. 1, is included in the brake pipe charging path at each remote unit to detect air flow from the air supply through the relay valve 117 to the brake pipe 101. If the flow rate (which is determined by a differential pressure) exceeds a predetermined value, a brake application is declared. That is, the brake pipe pressure has fallen to a value consistent with a brake application (which would have been initiated from the lead locomotive). If concurrently the communications system is inoperative, then in response to the simultaneous occurrence of these two events, the remote unit brake pipe valve 120 is commanded to a cut-out or closed position. Proper execution of the command closes the remote unit brake pipe valve 120. As a result, the brake application initiated by the venting of the brake pipe at the lead unit cannot be countered by pressurizing of the brake pipe at the remote unit.

If the command to cut-out or close the brake pipe valve 120 is not properly executed, then the brake valve at the remote unit remains open. There are several possible causes for this scenario, including a failure of the brake valve cut-out valve 250 (i.e., the valve that drives the brake pipe valve into a cut-off or closed configuration), a failure of the pilot valve 251 that drives the brake valve cut-out valve, or a brake pipe valve 120 stuck in the open position. Thus, if the brake pipe valve is not closed or cut-out as commanded, and during a communications system failure the lead unit issues a brake application, then the remote units continue to supply brake pipe recharging pressure while the lead unit is venting the brake pipe to apply the railcar brakes. This sets up an undesirable situation where the front railcars experience maximum braking and rear railcars experience minimum or no braking action. The net result is that the rear of the train can run into the front of the train, causing high in-train forces and possible derailment.

In very long conventional trains when the operator makes a brake application, the brake pipe pressure must be exhausted from the front or leading locomotive. Since the brake pipe length is very long, the front part of the train will be heavily applying the brakes while the rear part of the train may still be reducing its brake pipe and the resulting car braking reduced. This situation sets up a similar undesirable situation as above where the front part of the train has full braking and the rear part of the train has minimal braking resulting in potentially high in-train forces, which could possibly cause a derailment.

The situation above becomes more pronounced in distributed power trains where train lengths are much longer than conventional trains. With good communications between the lead and remote, train braking is applied simultaneously at both the front of the train via the lead locomotive and the rear part of the train via the remote locomotive. This provides an even reduction in brake pipe pressure throughout the train, which results in a more uniform braking effort by the cars resulting in lower in-train forces. When communications are disrupted in a distributed power train, and the operator makes a brake application, then the undesirable situation of heavy braking at the front of the train and minimal braking at the rear of the train still occurs. Even with the remote locomotive detecting the brake application and cutting out the brake valve, the brake pipe pressure must still be exhausted by the lead locomotive which results in the front part of the train having full braking and the rear part of the train having minimal braking.

BRIEF DESCRIPTION OF THE INVENTION

An adaptive brake system is provided for a distributed power railroad train that includes a lead locomotive, at least one remote locomotive and a plurality of railcars interconnected by a fluid-carrying brake pipe as a component of a brake control system at each of the lead locomotive and remote locomotive. The lead locomotive issues braking commands to the remote locomotive over a radio frequency or wire based communication system between the lead locomotive and the remote locomotive, and the lead locomotive and at least one remote locomotive are each in fluid communications with the brake pipe for controlling the brake pipe fluid pressure at each of the lead locomotive and the at least one remote locomotive. The adaptive brake system comprises an input command mechanism on the lead locomotive for entering a braking command associated with a brake application, which command is sent via the communication system to the remote locomotive; however, there exists a loss of communication relative to the braking command between the lead locomotive and the remote locomotive.

A sensor is provided for detecting a brake pipe fluid pressure in the brake pipe line at the remote locomotive and transmits one or more signals indicative of the brake pipe fluid pressure at the remote locomotive. In addition a controller at the remote locomotive is linked to the sensor and the brake control system, and a database is provided having data relative to a brake pipe fluid pressure indicative of brake application initiated at the lead locomotive and data relative to a predetermined brake pipe pressure level in the event a brake application is detected.

The controller compares signals received from the sensor to the brake pipe pressure data to determine that a brake application has been initiated at the lead locomotive and transmits a signal to the brake control system, which signal is indicative of a predetermined brake pipe fluid pressure level; and, the brake control system, responsive to the signal received from the controller, reduces the brake pipe fluid pressure in the brake pipe at the remote locomotive to the predetermined brake pipe fluid pressure level.

In an embodiment, the communication system generates signals at the lead locomotive and the remote locomotive indicative of a communication loss between the lead and remote units. When a brake application is initiated at the lead locomotive and there is a communication loss signal at the lead unit, the brake pipe pressure at the lead unit is reduced to a predetermined brake pipe pressure level. In addition, when a communication loss signal is generated or received at the remote unit, and the remote unit determines, via the sensor and controller, that a brake application has been initiated at the lead unit, the brake pipe fluid pressure level at the remote unit is reduced to the predetermined pressure level.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
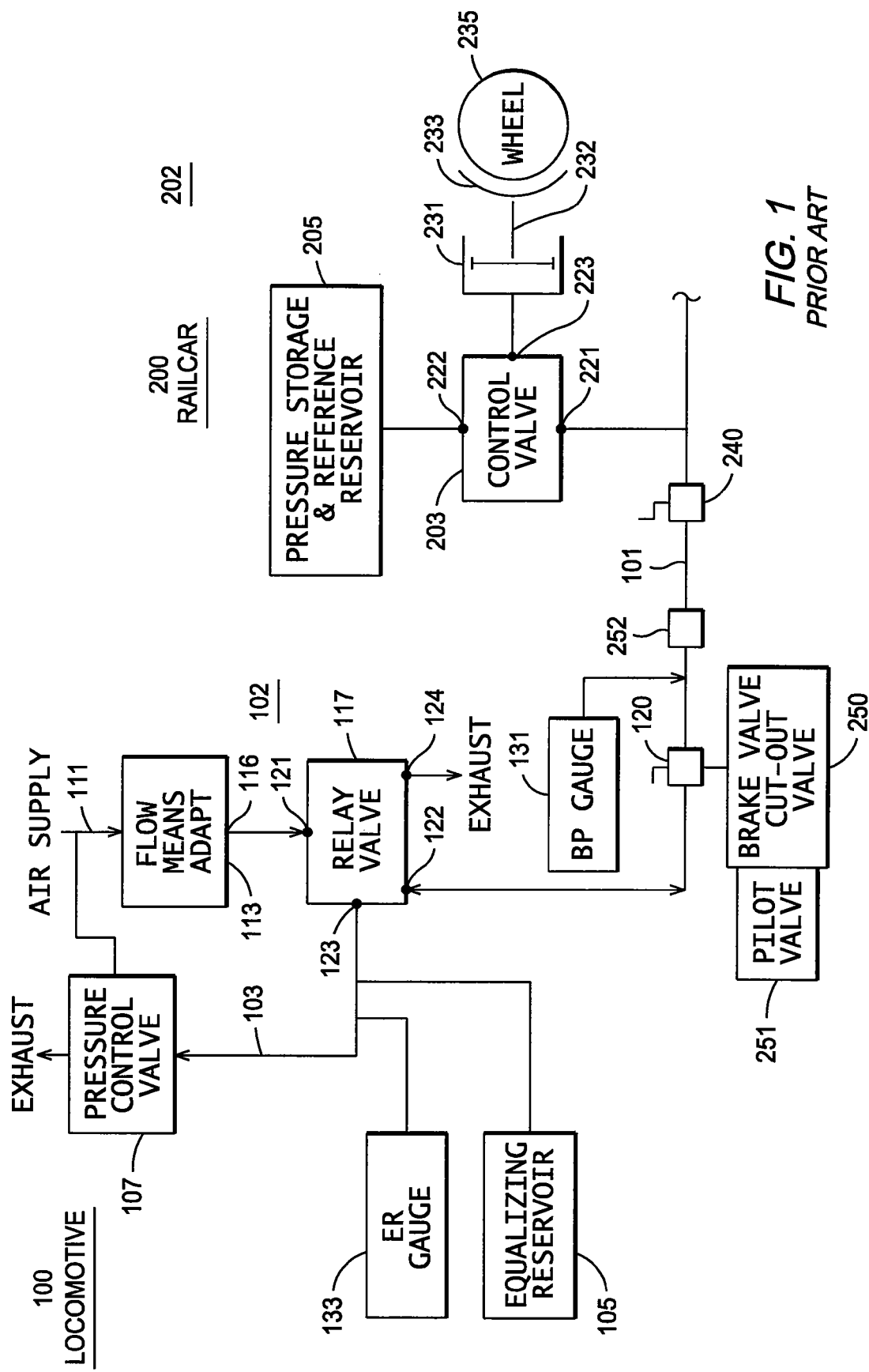
FIG. 1 is a block diagram of a prior art train braking system according to the teachings of the present invention.

Before describing in detail the particular method and apparatus for the control of railroad train braking systems in accordance with the present invention, it should be observed that the present invention resides primarily in a novel combination of hardware and software elements related to said method and apparatus. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

Figure 2:
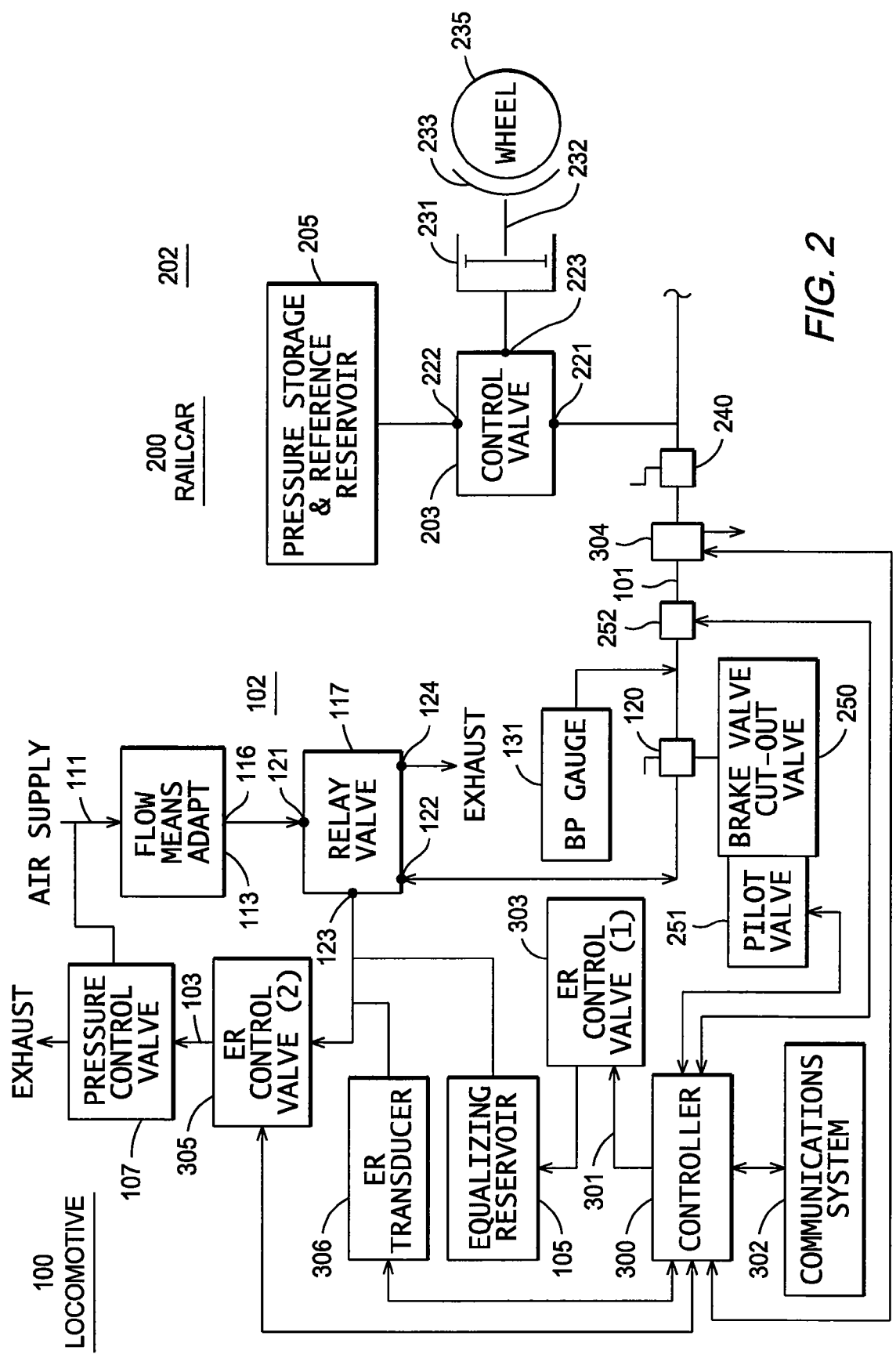
FIG. 2 is a block diagram of a train braking system according to the teachings of the present invention.

As applied to a distributed power train operation, the present invention ensures that a brake application initiated at the lead locomotive is coordinated with a brake application at the remote locomotive to enable more uniform braking through out the train, there by minimizing in-train forces. Turning to FIG. 2, the locomotive 100 of the prior art is augmented with a controller 300, responsive to the flow measuring adapter 113, for controlling the equalizing reservoir pressure via a link 301 and control valves 303 and 305, an equalizing reservoir pressure transducer 306 and a communications system 302. To execute the teachings of the present invention, the controller 300 is preferably located in both a lead locomotive and a remote locomotive, although this is not required as a single controller 300 on the remote unit may function to control certain air brake components of the remote unit to avoid the potentially destructive braking scenarios described above. The communications system 302 comprises the various elements as discussed above that provide communications between the remote power unit and the lead power unit.

In an embodiment of the present invention, whenever there is an interruption in the communications system 302 the controller 300 for each of the lead and remote units are programmed to coordinate a brake application. Specifically, a signal indicating that the communications system is not operative is provided by the communications system 302 to the controller 300 for each of the lead and remote units. When an operator at the lead unit issues a brake command, and the communication system 302 signals an interruption or loss of signal, the controller 300 at the lead unit and at the remote unit transmits one or more signals responsive to which the brake pipe fluid pressure at the lead unit is reduced to a predetermined brake pipe fluid pressure level.

A sensor 252 at the remote unit monitors the brake pipe pressure at the remote unit transmitting signals indicative of the brake pipe pressure to the controller 300. In the case when there is a communication loss, when the controller 300 at the remote unit receives a signal from the sensor 252, which is indicative of a brake application from the lead unit, and the controller also reads that there is a communication loss, the controller 300 transmits a predetermined signal to the pressure control valve 303 on the remote unit to vent the equalizing reservoir 105. While the equalizing reservoir 105 is vented, the reduction in pressure will cause the pressure control valve 107 to pump air from the air supply 111 to the equalizing reservoir to recharge the equalizing reservoir 105. However, the controller 300 will close control valve 305 to prevent the equalizing reservoir 105 from being charged. The drop in pressure in the equalizing reservoir 105 will cause the relay valve 117 to exhaust the brake pipe 101 to a predetermined brake pipe fluid pressure level. The equalizing reservoir transducer 306 monitors the pressure in the equalizing reservoir 105, and transmits a signal to the controller 300 to close control valve 303 when the pressure has reached the predetermined pressure level. In an alternative embodiment an emergency valve 304 on the brake line 101 can be controlled by controller 300. Per a signal from the controller 300, the emergency valve 304 may be opened to directly exhaust the brake pipe 101.

As described above, when there is an interruption in the communications system the remote unit may be charging the brake pipe 101 during a breaking operation, which may increase in-train forces during a brake application. However, the reduction in brake pipe pressure propagates rapidly to the remote unit so the sensor 252 may detect the pressure reduction/brake application within a matter of two to three seconds from the initiation of the brake application. A database is provided that includes data relative to one or more reductions in brake pipe fluid pressure that are indicative of a brake application initiated at the lead unit. Once the brake pipe pressure at the remote unit drops below a certain or predetermined pressure level, the controller 300 transmits a signal indicative of a reduction of the brake pipe pressure to a level consistent with or inline with the brake pipe pressure of the lead unit. In this manner, the in-train forces may be reduced during a brake application when there is an interruption in the communication system.

By way of example, distributed power trains equipped with UIC braking equipment typically operate with about 70 psi release pressure and about 50 psi full service application pressure. The braking range is 20 psi so no additional braking forces are applied below 50 psi. In addition, such braking systems may also have a minimum service brake application of about 7 psi. During a communication loss, an operator may make a heavy break reduction and the brake pipe pressure at the lead unit may drop quickly to 50 psi. The first service reduction, which will be initiated when the brake pressure drops below about 65 psi propagates to the remote in about two to three seconds. The remote unit detects the drop in brake pipe pressure and the controller 300 transmits a command to drop the brake pipe pressure to a predetermined pressure level or reduce the pressure by a predetermined amount, for example 10 psi to 12 psi. In such a case the lead brake pressure will be 50 psi and the remote brake pipe pressure will be 58 psi to 60 psi; therefore, the difference in brake pipe pressure is about 8 psi to 10 psi, compared to 13 psi to 20 psi without such a default system. In a case where there is a minimum brake pressure reduction, for example 7 psi, the lead locomotive would reduce its brake pipe pressure by the predetermined range of 10 psi to 12 psi so both the lead unit and remote unit brake pressures are consistent.

The communication system 302, such as the LOCOTROL® radio based (RDP) or wired based (WDP) communication system manufactured and sold by General Electric Transportation out of Erie, Pa., is typically set to transmit a signal from the lead unit to the remote unit about every 20 seconds; however, the transmission rate can be updated to transmit more often such as every one to two seconds. If there is a brake application at the lead unit a command, the lead unit can expect a reply from the remote unit in about 0.05 seconds. When the lead unit transmits a brake application and the remote unit does not reply in a predetermined time period i.e. 0.05 seconds, the lead unit detects a communication loss. In an embodiment, if the brake application requires a reduction in pressure that is within an acceptable range (i.e. ±5 psi) of the predetermined pressure reduction amount or the predetermined pressure level, the lead unit may not default to the predetermined pressure reduction. The acceptable range may include a brake application that is equal to or greater than the predetermined reduction, and the lead unit may not default to the predetermined level; however, if the brake application is less than the predetermined reduction, the lead unit will default to the predetermined pressure reduction or limit.

Figure 3:
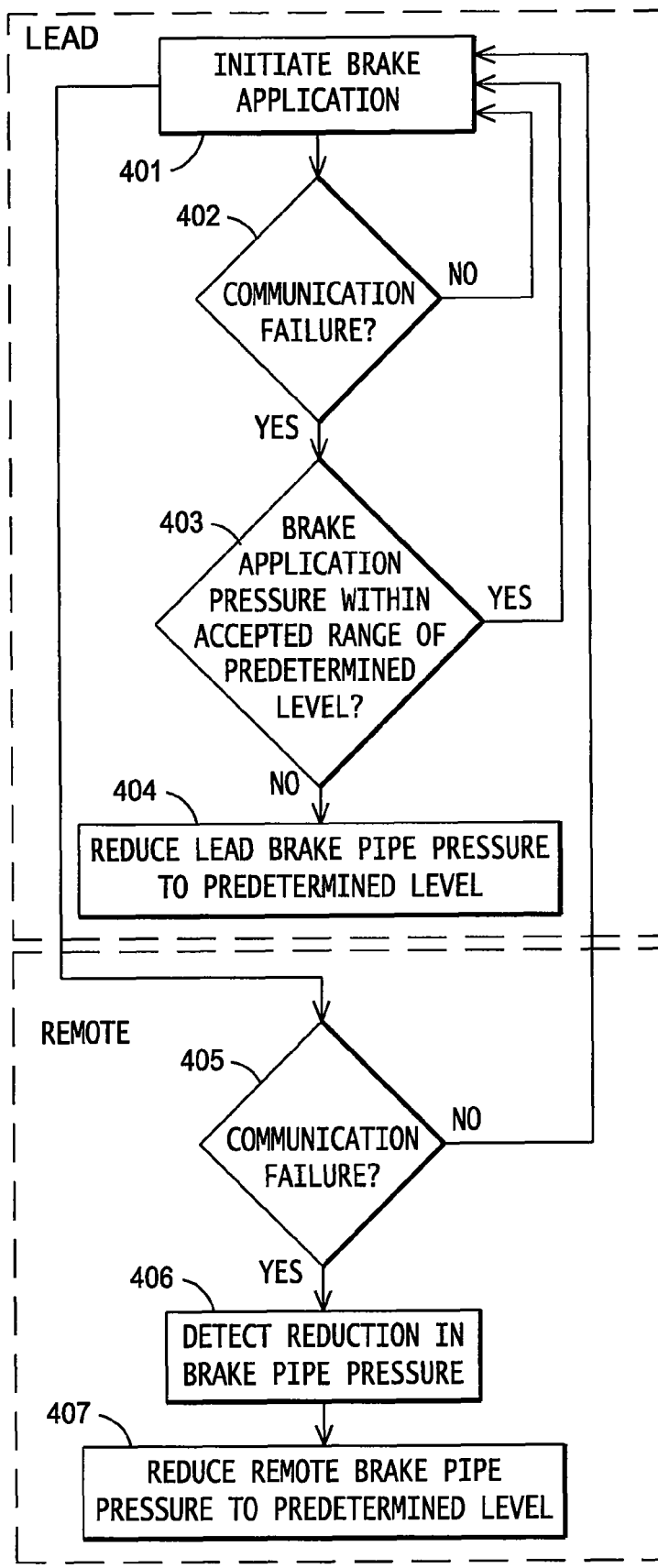
FIG. 3 is a flow chart illustrating the steps associated with the train braking system according to various embodiments of the present invention.

With respect to FIG. 3, there is a flow chart providing an example of steps followed during application of an embodiment of the invention. In step 401 a brake application is initiated, which brake application may include any brake application such as a minimum application (~7 psi), a service brake application or an emergency brake application. The controller 300, in step 402, then determines whether there is an interruption in the communication system 302. If there is not a communication failure then the brake application continues. If there is a communication loss between the lead and remote units, at step 403, the controller 300 determines whether the brake application initiated is within an accepted range of a predetermined pressure level or predetermined reduction in pressure. If the brake application is within the acceptable range, the brake application continues; however, if the brake pipe fluid pressure is not within the acceptable range the controller defaults to reduce the brake pipe pressure to the predetermined level, as set forth in step 404. Note, that step 403 is not required. That is controller 300 may be programmed to exhaust the equalizing reservoir 105 regardless of brake application if there is a communications loss.

Also shown in FIG. 3 are steps followed at the remote locomotive when a brake application has been initiated at the lead unit and there is a communications interruption between the lead locomotive and the remote locomotive. For example, if the remote has not received any signal from the lead unit for a predetermined amount of time a signal indicative of the communication interruption may be generated by the communication system 302, or the controller 300. In a scenario when the remote is receiving a communication signal from the lead unit and the lead signal is not receiving a response signal from remote unit, the lead unit may send a status signal indicative of a communication loss to the remote unit. In step 405, the controller 300 for the remote unit receives the signal that there is a communication failure, and then in step 406 the remote detects a reduction in brake pipe pressure consistent with a brake application initiated at the lead unit. More specifically, sensor 252 transmits one or more signals to the controller, which signals are indicative of the brake pipe fluid pressure at the remote unit. The controller 300 in step 407 for the remote unit, determining that a brake application has been initiated, then generates a signal responsive to which the equalizing control valve 303 exhausts the equalizing reservoir 105. When the brake pipe pressure reaches the predetermined pressure level, the relay valve 117 pressure at the port 122 (connected to the brake pipe 101) equals the pressure at the port 123 (connected to the equalizing reservoir 105). This condition causes the relay valve 117 to close the exhaust port 122 blocking the fluid flow path from the brake pipe 101 to the exhaust port 124 via the relay valve 117. In this manner, the pressure differential in the brake pipes 101 at the lead unit and remote unit during a brake application are within an acceptable range to reduce in-train forces during the brake application.

With respect to steps 405 and 406, the orders in which these steps are performed are not limited to that shown in FIG. 3. That is the controller 300 in step 406 may detect a reduction in brake pipe pressure before or close to the same time that the controller receives a signal indicative of a loss of communication. Indeed, step 405 may be eliminated altogether. Once the controller 300 determines there is a drop in brake pipe pressure consistent with that of a brake application, the controller 300 may transmit a signal responsive to which the control valve 303 exhausts the equalizing reservoir 105 to reduce the brake pipe pressure in the brake line 101 to the predetermined level. In this manner the pressure differential between brake pipe pressure at the lead unit and at the remote unit is reduced to minimize in-train forces.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

What is claimed is:

1. An adaptive brake system for a distributed power railroad train comprising a lead locomotive, at least one remote locomotive and a plurality of railcars interconnected by a fluid-carrying brake pipe as a component of a brake control system at each of the lead locomotive and the at least one remote locomotive, wherein the lead locomotive issues a braking command to the at least one remote locomotive over a communication system between the lead locomotive and the at least one remote locomotive, and wherein the lead locomotive and at least one remote locomotive are each in fluid communications communication with the brake pipe for controlling a brake pipe fluid pressure at each of the lead locomotive and the at least one remote locomotive, the system comprising:

an input command mechanism on the lead locomotive for entering the braking command associated with a brake application, the braking command sent via the communication system to the at least one remote locomotive;

wherein there exists a loss of communication relative to the braking command between the lead locomotive and the remote locomotive over the communications system;

a sensor for detecting the brake pipe fluid pressure in the brake pipe line at the at least one remote locomotive that transmits one or more pressure signals indicative of the brake pipe fluid pressure at the remote locomotive;

a remote controller at the at least one remote locomotive that is linked to the sensor and the brake control system, a database having data relative to the brake pipe fluid pressure indicative of a brake application initiated at the lead locomotive and data relative to a predetermined brake pipe pressure level in the event that the brake application is detected; and, wherein the remote controller compares the one or more pressure signals received from the sensor to the data relative to the brake pipe fluid pressure to determine that the brake application has been initiated at the lead locomotive and transmits a fluid pressure level signal to the brake control system that is indicative of a predetermined brake pipe fluid pressure level; and, wherein the brake control system reduces the brake pipe fluid pressure in the brake pipe at the at least one remote locomotive to the predetermined brake pipe fluid pressure level responsive to the signal received from the remote controller.

2. The system of claim 1 wherein the remote controller at the at least one remote locomotive is linked to the communication system, which transmits a communication loss signal to the remote controller that is indicative of a communication loss between the lead locomotive and the at least one remote locomotive, and the remote controller determines whether the brake application has been initiated at the lead locomotive responsive to the communication loss signal.

3. The system of claim 1 wherein the brake control system comprises an equalizing reservoir in fluid communication with the brake pipe at the at least one remote locomotive and a control valve in fluid communication with the equalizing reservoir, wherein the control valve exhausts the equalizing reservoir to reduce the brake pipe fluid pressure to the predetermined brake pipe pressure level responsive to one or more exhaust signals from the remote controller.

4. The system of claim 1 further comprising an emergency exhaust valve in the brake pipe to exhaust brake pipe fluid so that the brake pipe fluid pressure is changed to the predetermined brake pipe fluid pressure responsive to one or more exhaust signals received from the remote controller.

5. The system of claim 1 further comprising a lead controller at the lead locomotive that is linked to the brake control system and the communication system which transmits a communication loss signal indicative of a loss of communication between the remote locomotive and the lead locomotive, and the lead controller at the lead locomotive transmits a pressure signal indicative of the predetermined brake pipe fluid pressure level responsive to the communication loss signal and the brake control system reduces the brake pipe fluid pressure in the brake pipe at the lead locomotive to the predetermined brake pipe fluid pressure level responsive to the pressure signal received from the lead controller.

6. The system of claim 1 further comprising a lead controller at the lead locomotive that transmits a pressure signal indicative of the predetermined brake pipe fluid pressure level to the brake control system at the lead locomotive only when a first reduction in the brake pipe fluid pressure initiated by the brake application is less than a second reduction in the brake pipe pressure fluid pressure that reduces the brake pipe fluid pressure to the predetermined brake pipe fluid pressure.

7. A method for controlling a braking operation in a distributed power railroad train comprising a lead locomotive, at least one remote locomotive and a plurality of railcars interconnected by a fluid-carrying brake pipe as a component of a brake control system on each of the lead locomotive and the at least one remote locomotive, wherein the lead locomotive issues a braking command to the at least one remote locomotive over a communication system between the lead locomotive and the at least one remote locomotive, and wherein the lead locomotive and the at least one remote locomotive are in fluid communication with the brake pipe for controlling a brake pipe fluid pressure at each of the lead locomotive and the at least one remote locomotive, the method comprising:

receiving data from a database, the data relating to one or more brake pipe fluid pressure levels that are indicative of a brake application initiated at the lead locomotive;

transmitting a braking command signal via the communication system from the lead locomotive to the at least one remote locomotive, the braking command signal is indicative of the braking command associated with a brake application;

providing a communication loss signal indicative of a loss of communication in the communication system between the lead locomotive and the at least one remote locomotive over the communication system;

detecting a reduction in the brake pipe fluid pressure at the at least one remote locomotive that is indicative of the brake application initiated at the lead locomotive; and, reducing the brake pipe fluid pressure at the at least one remote locomotive to a reduced predetermined brake pipe fluid pressure limit.

8. The method of claim 7 further comprising reducing the brake pipe fluid pressure at the lead locomotive to the reduced predetermined brake pipe fluid pressure limit.

9. The method of claim 7 further comprising:

detecting the brake pipe fluid pressure at the at least one remote locomotive with at least one sensor linked to the brake pipe at the at least one remote locomotive;

transmitting one or mores pressure signals indicative of the brake pipe fluid pressure at the remote locomotive to a controller;

accessing the brake pipe fluid pressure level data via the controller; and determining whether the brake pipe pressure level at the at least one remote locomotive is indicative of the brake application initiated at the lead locomotive.

10. The method of claim 9 further comprising transmitting the communication loss signal to the controller and determining whether the brake pipe fluid pressure at the at least remote locomotive is indicative of the brake application initiated at the lead locomotive via the controller.

11. The method of claim 7 further comprising, at the lead locomotive, transmitting the communication loss signal to a controller on the lead locomotive and reducing the brake pipe fluid pressure at the lead locomotive to the predetermined brake pipe pressure limit.

12. A computer program for controlling a braking operation in a distributed power railroad train comprising a lead locomotive, at least one remote locomotive and a plurality of railcars interconnected by a fluid-carrying brake pipe as a component of a brake control system on each of the lead locomotive and the at least one remote locomotive, wherein the lead locomotive issues a braking command to the at least one remote locomotive over a communication system between the lead locomotive and the at least one remote locomotive, and wherein the lead locomotive and the at least one remote locomotive are in fluid communication with the brake pipe for controlling a brake pipe fluid pressure at each of the lead locomotive and the at least one remote locomotive, the computer program comprising one or more computer modules for:

transmitting a braking command signal via the communication system from the lead locomotive to the at least one remote locomotive, the braking command signal indicative of the braking command associated with a brake application;

providing a communication loss signal indicative of a loss of communication in the communication system between the lead locomotive and the at least one remote locomotive over the communications system;

detecting a reduction in the brake pipe fluid pressure at the at least one remote locomotive that is indicative of the brake application initiated at the lead locomotive; and, reducing the brake pipe fluid pressure at the at least one remote locomotive to a reduced predetermined brake pipe fluid pressure limit.

13. The computer program of claim 12 wherein the computer program includes the one or more computer modules for reducing the brake pipe fluid pressure at the lead locomotive to the reduced predetermined brake pipe fluid pressure limit.

14. The computer program of claim 12 wherein the computer program includes the one or more computer modules for providing a database that includes data relative to one or more brake pipe fluid pressure levels that are indicative of the brake application initiated at the lead locomotive.

15. The computer program of claim 14 wherein the computer program includes the one or more computer modules for:

detecting the brake pipe fluid pressure at the at least one remote locomotive and transmitting to a controller one or more pressure signals indicative of the brake pipe fluid pressure at the at least one remote locomotive, accessing the data relative to the one or more brake pipe fluid pressure levels via the controller, and determining whether the brake pipe pressure level at the at least one remote locomotive is indicative of the brake application initiated at the lead locomotive.

16. The computer program of claim 15 wherein the computer program includes the one or more computer modules for transmitting the communication loss signal to the controller and for determining via the controller whether the brake pipe fluid pressure at the at least remote locomotive is indicative of the brake application initiated at the lead locomotive.

17. The computer program of claim 12 wherein the computer program includes the one or more computer modules for transmitting the communication loss signal to a controller on the lead locomotive and for reducing the brake pipe fluid pressure at the lead locomotive to the predetermined brake pipe pressure limit responsive to the communication loss signal.

* * * * *